(12) United States Patent
Kim et al.

(10) Patent No.: US 12,255,021 B2
(45) Date of Patent: Mar. 18, 2025

(54) MULTILAYER ELECTRONIC COMPONENT

(71) Applicant: SAMSUNG ELECTRO-MECHANICS CO., LTD., Suwon-si (KR)

(72) Inventors: Kyung Sik Kim, Suwon-si (KR); Si Taek Park, Suwon-si (KR); Min Young Choi, Suwon-si (KR); Jae Sung Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 100 days.

(21) Appl. No.: 17/994,629

(22) Filed: Nov. 28, 2022

(65) Prior Publication Data

US 2023/0207202 A1 Jun. 29, 2023

(30) Foreign Application Priority Data

Dec. 29, 2021 (KR) .................. 10-2021-0191316

(51) Int. Cl.
*H01G 4/12* (2006.01)
*H01G 4/012* (2006.01)
*H01G 4/30* (2006.01)

(52) U.S. Cl.
CPC ........... *H01G 4/1227* (2013.01); *H01G 4/012* (2013.01); *H01G 4/30* (2013.01)

(58) Field of Classification Search
CPC ......... H01G 4/1227; H01G 4/012; H01G 4/30
See application file for complete search history.

(56) References Cited

U.S. PATENT DOCUMENTS

2012/0057271 A1* 3/2012 Oh .................. C03C 14/004
977/831
2014/0301013 A1* 10/2014 Kim ..................... H01G 4/01
29/25.03

(Continued)

FOREIGN PATENT DOCUMENTS

| JP | 2016-175782 A | 10/2016 |
| KR | 10-1792368 B1 | 11/2017 |
| KR | 10-2021-0095608 A | 8/2021 |

OTHER PUBLICATIONS

Amador C. Caballero et al., Grain Growth Control and Dopant Distribution in ZnO-Doped BaTiO3, vol. 81, No. 4, 1998, pp. 939-944.

(Continued)

*Primary Examiner* — Michael P McFadden
(74) *Attorney, Agent, or Firm* — Morgan, Lewis & Bockius LLP

(57) ABSTRACT

A multilayer electronic component includes: a body including dielectric layers and a plurality of first and second internal electrodes alternately disposed with respective dielectric layers interposed; and external electrodes disposed on the body, wherein the body includes a capacitance formation portion forming capacitance by including the first and second internal electrodes alternately disposed with respective dielectric layers interposed therebetween and margin portions formed on opposite side surfaces of the capacitance formation portion, respectively, the dielectric layer and the margin portion include a $BaTiO_3$-based main component, and the margin portion includes an oxide including Zn as a first accessory component and includes Zn in an amount of 0.5 mol % or more and less than 1.5 mol % based on 100 mol % of Ti included in the margin portion.

19 Claims, 8 Drawing Sheets

(56) References Cited

U.S. PATENT DOCUMENTS

| | | | |
|---|---|---|---|
| 2014/0313634 A1* | 10/2014 | Yoon | H01G 4/30 |
| | | | 501/137 |
| 2016/0002111 A1* | 1/2016 | Yoon | H01G 4/1227 |
| | | | 501/138 |
| 2017/0186543 A1 | 6/2017 | Park et al. | |
| 2019/0057813 A1* | 2/2019 | Okamoto | H01G 4/1227 |
| 2019/0100465 A1* | 4/2019 | Yoon | H01G 4/30 |
| 2020/0258685 A1* | 8/2020 | Ham | H01G 4/1227 |
| 2020/0395174 A1* | 12/2020 | Kim | H01G 4/012 |
| 2021/0074479 A1* | 3/2021 | Lee | H01G 4/224 |

OTHER PUBLICATIONS

E. R. Segnit et al., The Ternary System BaO—ZnO—SiO2, Jan. 19, 1970, pp. 1077-1085.

* cited by examiner

MULTILAYER ELECTRONIC COMPONENT

CROSS-REFERENCE TO RELATED APPLICATION(S)

This application claims benefit of priority to Korean Patent Application No. 10-2021-0191316 filed on Dec. 29, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), one of multilayer electronic components, is a chip-type condenser mounted on a printed circuit board of several electronic products such as an image device, for example, a liquid crystal display (LCD), a plasma display panel (PDP) or the like, a computer, a smartphone, a mobile phone, and the like, to serve to charge or discharge electricity therein or therefrom.

The multilayer ceramic capacitor may be used as components of various electronic apparatuses since it has a small size, implements a high capacitance, and may be easily mounted. Recently, in accordance with miniaturization and performance improvements of electronic devices, multilayer ceramic capacitors have also tended to be miniaturized and to have high capacitance. In accordance with such a trend, it has become important to secure high reliability in multilayer ceramic capacitors.

Recently, a dielectric layer or an internal electrode layer of the multilayer ceramic capacitor has been thinned in order to achieve the miniaturization and the high capacitance of the multilayer ceramic capacitor. When the dielectric layer is thinned, it is necessary to suppress grain growth generated at the time of sintering a dielectric in order to secure high effective capacitance and temperature stability. To this end, there has been an attempt to induce a grain growth suppression effect of the dielectric layer using a drag effect according to grain boundary segregation.

However, there is a problem in which a large electric field per unit thickness is applied to the thin dielectric layer and the thin dielectric layer is sensitive to a temperature change, and it is difficult to implement effective capacitance and temperature characteristics under an actual use condition.

In addition, when the grain growth is excessively suppressed, a compactness decrease problem of the dielectric layer decreases may occur, and a permittivity decrease problem of the dielectric layer may occur. In particular, a dielectric layer included in a capacitor forming part contributes to forming capacitance of the multilayer electronic component. Therefore, when grain growth of dielectric grains is excessively suppressed in the dielectric layer included in the capacitor forming part, there may be a difficulty in miniaturization and performance improvement of the multilayer electronic component.

In addition, in a multilayer electronic component having a structure in which a margin portion is attached to a side surface of the capacitor forming part, a problem such as breakdown voltage breakdown may occur mainly at a distal end of the margin portion.

Accordingly, in order to solve these problems, it is necessary to make a component of the margin portion concrete so as to improve reliability of the multilayer electronic component while decreasing a side effect of an excessive grain growth suppression effect of the dielectric layer.

SUMMARY

An aspect of the present disclosure may provide a multilayer electronic component in which a compactness decrease and permittivity decrease problem in which may occur when grain growth of a dielectric layer included in a capacitor forming part is excessively suppressed may be solved.

An aspect of the present disclosure may also provide a multilayer electronic component in which a problem in which (DF) increases and an effective a dissipation factor capacitance change rate under a direct current (DC) electric field increases when grain growth of a margin portion may not be suppressed may be solved.

An aspect of the present disclosure may also provide a multilayer electronic component in which a problem in which the multilayer electronic component is vulnerable to penetration of external moisture due to a decrease in compactness when grain growth of a margin portion is suppressed may be solved.

However, an aspect of the present disclosure is not limited thereto, and may be more easily understood in a process of describing exemplary embodiments in the present disclosure.

According to an aspect of the present disclosure, a multilayer electronic component may include: a body including dielectric layers and a plurality of first and second internal electrodes alternately disposed with respective dielectric layers interposed therebetween and having first and second surfaces opposing each other in a first direction, third and fourth surfaces connected to the first and second surfaces and opposing each other in a second direction, and fifth and sixth surfaces connected to the first to fourth surfaces and opposing each other in a third direction; and external electrodes disposed on the body, wherein the body includes a capacitance formation portion forming capacitance by including the first and second internal electrodes alternately disposed with respective dielectric layers interposed therebetween and margin portions disposed on opposite side surfaces of the capacitance formation portion in the third direction, respectively, at least one of the dielectric layers and at least one of the margin portions include a $BaTiO_3$-based main component, and the margin portion includes an oxide including Zn as a first accessory component and includes Zn in an amount of 0.5 mol % or more and less than 1.5 mol % based on 100 mol % of Ti included in the margin portion.

According to another aspect of the present disclosure, a method for manufacturing a multilayer electronic component may include: cutting at least one surface of a laminate along a first direction, the laminate including dielectric layers and a plurality of first and second internal electrodes alternately disposed with respective dielectric layers interposed therebetween along the first direction; and applying at least one dielectric sheet to the at least one cut surface on the laminate to form a margin portion, wherein the at least one dielectric sheet includes an oxide including Zn.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
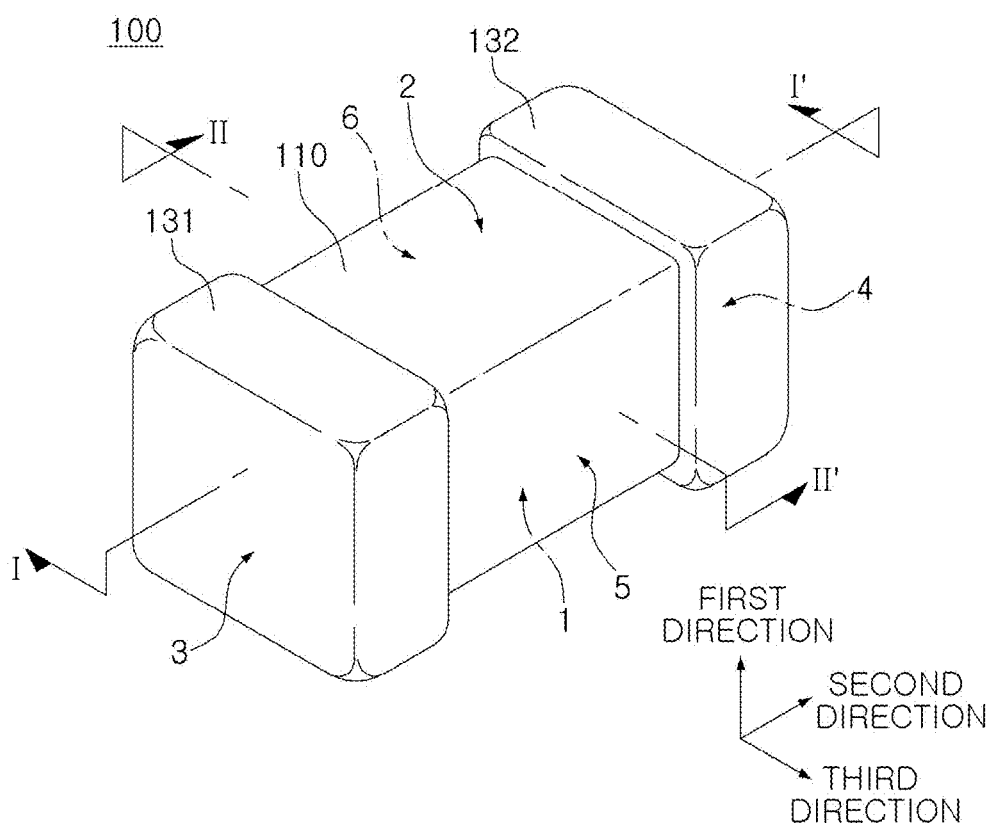
FIG. 1 is a schematic perspective view illustrating a multilayer electronic component according to an exemplary embodiment in the present disclosure.

Hereinafter, exemplary embodiments of the present disclosure will now be described in detail with reference to the accompanying drawings.

In the drawings, a first direction may refer to a stacking direction or a thickness T direction, a second direction may refer to a length L direction, and a third direction may refer to a width W direction.

FIG. 1 is a schematic perspective view illustrating a multilayer electronic component according to an exemplary embodiment in the present disclosure.

Figure 2:
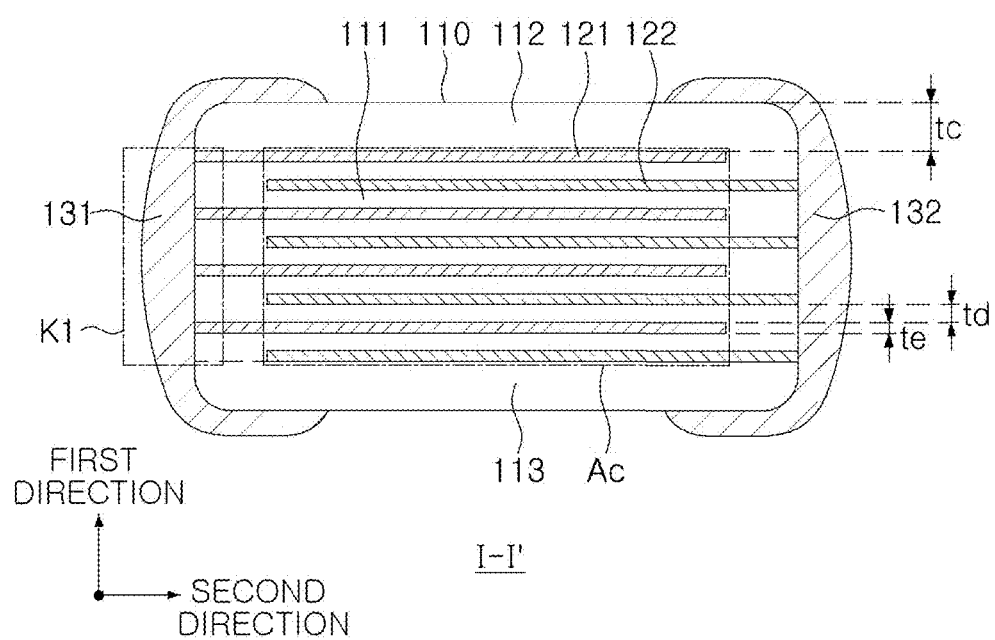
FIG. 2 is a cross-sectional view taken along line I-I' of FIG. 1.

FIG. 2 is a cross-sectional view taken along line I-I' of FIG. 1.

Figure 3:
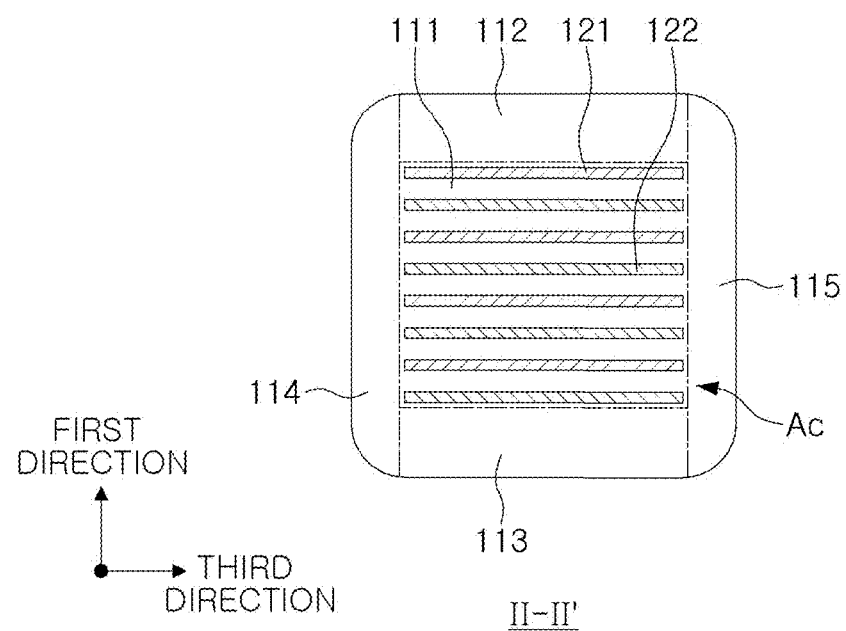
FIG. 3 is a cross-sectional view taken along line II-II' of FIG. 1.

FIG. 3 is a cross-sectional view taken along line II-II' of FIG. 1.

Figure 4:
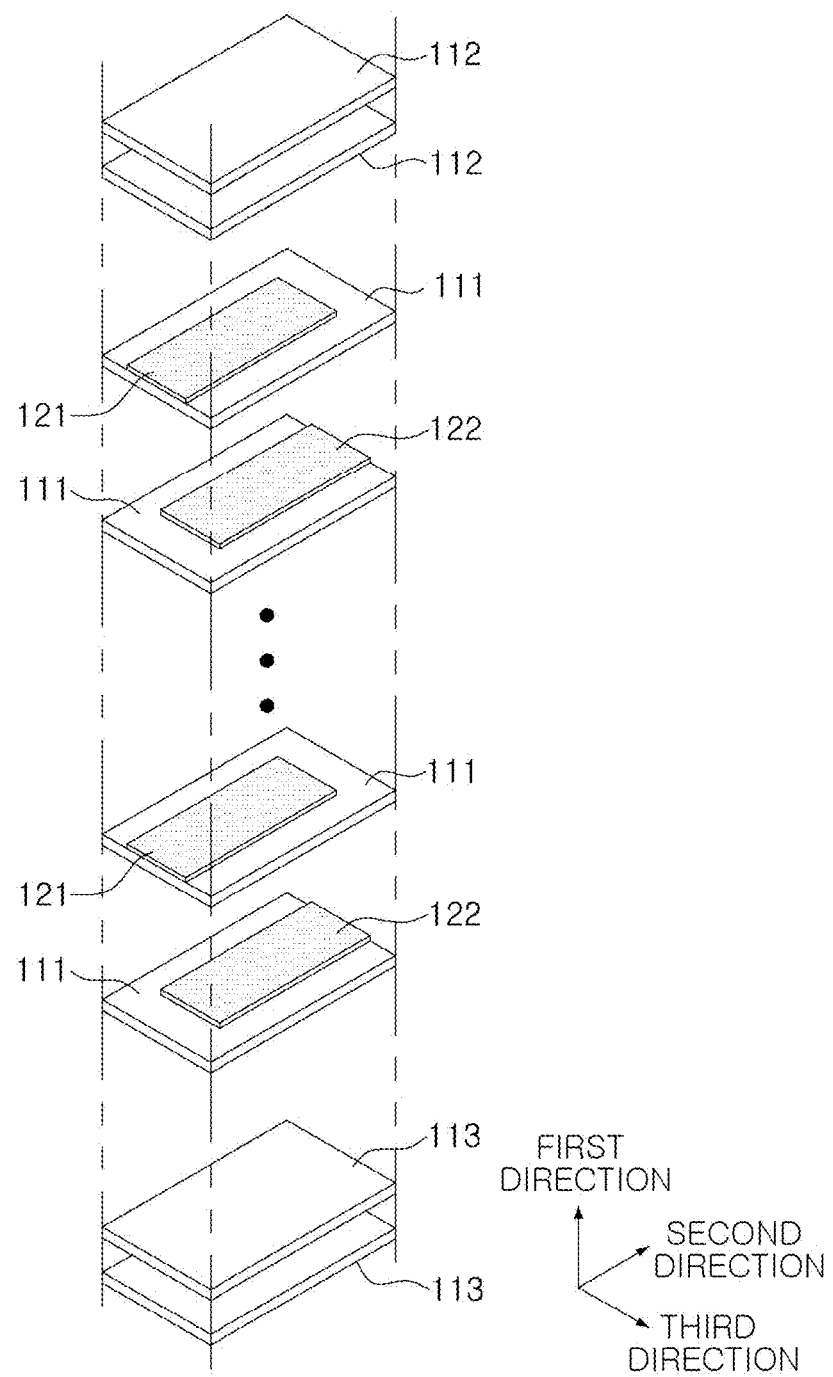
FIG. 4 is an exploded perspective view illustrating a body of the multilayer electronic component according to an exemplary embodiment in the present disclosure.

FIG. 4 is an exploded perspective view illustrating a body of the multilayer electronic component according to an exemplary embodiment in the present disclosure.

Hereinafter, a multilayer electronic component 100 according to an exemplary embodiment in the present disclosure will be described with reference to FIGS. 1 through 4.

The multilayer electronic component 100 according to an exemplary embodiment in the present disclosure may include a body 110 including dielectric layers and a plurality of first and second internal electrodes 121 and 122 alternately disposed with respective dielectric layers interposed therebetween and having first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces and opposing each other in a third direction; and external electrodes 131 and 132 disposed on the body, wherein the body includes a capacitance formation portion Ac forming capacitance by including the first and second internal electrodes alternately disposed with respective dielectric layers interposed therebetween and margin portions 114 and 115 formed on opposite side surfaces of the capacitance formation portion A in the third direction, respectively, the dielectric layer and the margin portion include a $BaTiO_3$-based main component, and the margin portion includes an oxide including Zn as a first accessory component and includes Zn in an amount of 0.5 mol % or more and less than 1.5 mol % based on 100 mol % of Ti included in the margin portion.

The body 110 may include the dielectric layers 111 and the internal electrodes 121 and 122 alternately stacked therein.

A shape of the body 110 is not particularly limited, and may be a hexahedral shape or a shape similar to the hexahedral shape, as illustrated in the drawings. Although the body 110 does not have a hexahedral shape having perfectly straight lines due to shrinkage of ceramic powders included in the body 110 in a sintering process, the body 110 may have a substantially hexahedral shape.

The body 110 may have the first and second surfaces 1 and 2 opposing each other in the first direction, the third and fourth surfaces 3 and 4 connected to the first and second surfaces 1 and 2 and opposing each other in the second direction, and the fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 may be in a sintered state, and adjacent dielectric layers 111 may be integrated with each other so that boundaries therebetween are not readily apparent without using a scanning electron microscope (SEM).

According to an exemplary embodiment in the present disclosure, a raw material of the dielectric layer 111 is not particularly limited as long as sufficient capacitance may be obtained. For example, a barium titanate-based material, a lead composite perovskite-based material, a strontium titanate-based material, or the like, may be used as the raw material of the dielectric layer 111. The barium titanate-based material may include $BaTiO_3$-based ceramic powders. Examples of the $BaTiO_3$-based ceramic powders may include $BaTiO_3$ and $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1$ and $0<y<1)$, $Ba(Ti_{1-y}Zr_y)O_3$ $(0<y<1)$, or the like, in which calcium (Ca), zirconium (Zr), or the like, is partially solid-dissolved in $BaTiO_3$.

In addition, a raw material of the dielectric layer 111 may include various ceramic additives, organic solvents, binders, dispersants, and the like, added to powders such as barium titanate $(BaTiO_3)$ powders, or the like, according to an object of the present disclosure.

Meanwhile, an average thickness td of the dielectric layer 111 does not need to be particularly limited. For example, the average thickness td of the dielectric layer 111 may be 0.2 μm or more and 2 μm or less.

However, in general, when the dielectric layer is formed to have a small thickness less than 0.6 μm, in particular, when a thickness of the dielectric layer is 0.35 μm or less, reliability of the multilayer electronic component 100 may be further decreased.

According to an exemplary embodiment in the present disclosure, since the margin portion includes the oxide including Zn as the first accessory component and includes Zn in an amount of 0.5 mol % or more and less than 1.5 mol % based on 100 mol % of Ti included in the margin portion, when the average thickness td of the dielectric layer 111 is 0.35 μm or less, a reliability improvement effect of the multilayer electronic component 100 according to the present disclosure may be more remarkable.

The average thickness td of the dielectric layer 111 may refer to an average thickness td of the dielectric layer 111 disposed between the first and second internal electrodes 121 and 122.

The average thickness td of the dielectric layer 111 may be measured from an image obtained by scanning a cross section of the body 110 in the length and thickness directions (L-T) with a scanning electron microscope (SEM) of 10,000 magnifications. More specifically, an average value may be measured by measuring thicknesses of one dielectric layer at 30 points positioned at equal intervals in the length direction in the obtained image. The 30 points positioned at equal intervals may be designated in the capacitance formation portion Ac. In addition, when an average thickness of ten dielectric layers is measured, the average thickness of the dielectric layers may further be generalized.

The body 110 may include the capacitance formation portion Ac disposed in the body 110 and forming capacitance by including the first internal electrodes 121 and the second internal electrodes 122 alternately disposed with each of the dielectric layers 111 interposed therebetween and cover parts 112 and 113 formed on upper and lower surfaces of the capacitance formation portion Ac in the first direction, respectively.

In addition, the capacitance formation portion Ac, which contributes to forming capacitance of a multilayer ceramic capacitor, may be formed by repeatedly stacking a plurality of first and second internal electrodes 121 and 122 with each of the dielectric layers 111 interposed therebetween.

The cover parts 112 and 113 may include an upper cover part 112 disposed on the upper surface of the capacitance formation portion Ac in the first direction and a lower cover part 113 disposed on the lower surface of the capacitance formation portion Ac in the first direction.

The upper cover part 112 and the lower cover part 113 may be formed by stacking a single dielectric layer or two or more dielectric layers on upper and lower surfaces of the capacitance formation portion Ac, respectively, in the thickness direction, and may basically serve to prevent damage to the internal electrodes due to physical or chemical stress.

The upper cover part 112 and the lower cover part 113 may not include the internal electrodes, and may include the same material as the dielectric layer 111.

That is, the upper cover part 112 and the lower cover part 113 may include a ceramic material such as a barium titanate ($BaTiO_3$)-based ceramic material.

Meanwhile, an average thickness of each of the cover parts 112 and 113 does not need to be particularly limited. However, the average thickness tc of each of the cover parts 112 and 113 may be 15 μm or less in order to more easily achieve miniaturization and a high capacitance of the multilayer electronic component. According to an exemplary embodiment in the present disclosure, since the margin portion includes the oxide including Zn as the first accessory component and includes Zn in an amount of 0.5 mol % or more and less than 1.5 mol % based on 100 mol % of Ti included in the margin portion, even when the average thickness tc of the cover part is 15 μm or less, generation of cracks in the multilayer electronic component may be suppressed.

The average thickness of each of the cover parts 112 and 113 may refer to a size of each of the cover parts 112 and 113 in the first direction, may be an average value of sizes, in the first direction, of the cover part 112 or 113 measured at five points positioned at equal intervals on the upper surface or the lower surface of the capacitance formation portion Ac.

In addition, the margin portions 114 and 115 may be disposed on side surfaces of the capacitance formation portion Ac.

The margin portions 114 and 115 may include a margin portion 114 disposed on the fifth surface 5 of the body 110 and a margin portion 115 disposed on the sixth surface 6. That is, the margin portions 114 and 115 may be disposed on opposite side surfaces of the body 110 in the third direction (width direction), respectively.

The margin portions 114 and 115 may refer to regions between both distal ends of the first and second internal electrodes 121 and 122 and boundary surfaces of the body 110 in a cross section of the body 110 cut in the width-thickness (W-T) directions, as illustrated in FIG. 3. The boundary surfaces of the body 110 may be determined using, for example, electron microscopy techniques or optical microscopy. Other methods and/or tools appreciated by one of ordinary skill in the art, even if not described in the present disclosure, may also be used.

The margin portions 114 and 115 may basically serve to prevent damage to the internal electrodes due to physical or chemical stress.

The margin portions 114 and 115 may be formed by applying a conductive paste onto ceramic green sheets except for places where the margin portions are to be formed to form the internal electrodes.

Alternatively, in order to suppress a step due to the internal electrodes 121 and 122, the margin portions 114 and 115 may be formed by stacking internal electrodes, cutting a laminate so that the internal electrodes are exposed to the fifth and sixth surfaces 5 and 6 of the body, and then stacking a single dielectric layer or two or more dielectric layers on opposite side surfaces of the capacitance formation portion Ac in the third direction (width direction).

Meanwhile, a width of each of the margin portions 114 and 115 does not need to be particularly limited. However, an average width of each of the margin portions 114 and 115 may be 15 μm or less in order to more easily achieve miniaturization and a high capacitance of the multilayer electronic component. In addition, according to an exemplary embodiment in the present disclosure, since the margin portion includes the oxide including Zn as the first accessory component and includes Zn in an amount of 0.5 mol % or more and less than 1.5 mol % based on 100 mol % of Ti included in the margin portion, even when the average width of each of the margin portions 114 and 115 is 15 μm or less, reliability of the multilayer electronic component may be improved.

The average width of each of the margin portions 114 and 115 may refer to an average size of each of the margin portions 114 and 115 in the third direction, and may be an average value of sizes, in the third direction, of the margin portions 114 and 115 measured at five points positioned at equal intervals on the side surfaces of the capacitance formation portion Ac.

According to an exemplary embodiment in the present disclosure, the margin portions 114 and 115 may include the $BaTiO_3$-based main component, include the oxide including Zn as the first accessory component, and may include Zn in an amount of 0.5 mol % or more and less than 1.5 mol % based on 100 mol % of Ti included in the margin portion.

In general, in order to decrease an effective capacitance change rate and secure temperature stability in a high-frequency low electric field environment, grain growth of a dielectric material generated at the time of performing sintering needs to be suppressed.

In order to suppress the grain growth of a ceramic material, a drag effect according to grain boundary segregation may be used. When the drag effect occurs, mobility within boundaries of dielectric grains may decrease to suppress the grain growth. Accordingly, in an exemplary embodiment in the present disclosure, the grain growth may be suppressed by adding zinc oxide (ZnO) as an additive capable of inducing the drag effect, but a decrease in effective capacitance change rate under a direct current (DC) electric field and reliability improvement may be implemented by controlling a content of zinc oxide (ZnO).

In general, zinc (Zn) ions may have a small size, and be thus suitable to substitute for B-site within a perovskite structure like $ABO_3$.

However, since a valency of zinc ions is lower than that of Ti, it may be difficult for zinc to be actually solid-dissolved.

The zinc (Zn) ions may have a valence of +2 and may be suitable for substituting for a Ba-site, that is, A-site, which has a valence of +2 in terms of a low valence, but may also have a large size mismatch with Ba having a large ion size, and may thus have a very low solid-solution limit.

Accordingly, when the zinc oxide (ZnO) is added, most of the zinc oxide (ZnO) is not solid-dissolved in a lattice, but may be segregated at grain boundaries in the form of the zinc oxide (ZnO). The zinc oxide (ZnO) segregated at the grain boundaries as described above may induce a drag effect that hinders the movement of the grain boundaries at the time of grain growth, and may thus suppress the grain growth of the ceramic material.

When the grain growth of the ceramic material is suppressed, a width of a domain wall in the dielectric grain may be decreased, such that the mobility of the domain wall may be increased under a high-frequency low electric field.

This may lead to an increase in a DC effective capacitance under the high-frequency low electric field. Furthermore, a size of the domain may be decreased, such that nominal capacitance at room temperature may be decreased. In addition, a ratio of a shell portion of a dielectric grain of a core-shell structure may be decreased, such that temperature stability may be improved.

However, when grain growth of the dielectric layer 111 included in the capacitor forming part Ac is excessively suppressed in order to achieve such an effect, a side effect that a permittivity of the multilayer electronic component decreases may occur. In addition, when the grain growth of only the dielectric layer 111 included in the capacitor forming part Ac is adjusted, a phenomenon in which breakdown voltage breakdown occurs at distal ends of the margin portions 114 and 115 may not be suppressed.

Accordingly, in the present disclosure, a content of the oxide including Zn, included in the margin portion may be adjusted to appropriately suppress grain growth of dielectric grains included in the margin portion, such that a dissipation factor (DF) and an effective capacitance change rate may be decreased, and compactness of the dielectric grains may be improved to improve high temperature and moisture resistance reliability.

According to an exemplary embodiment in the present disclosure, the margin portions 114 and 115 may include one or more selected from the group consisting of $BaTiO_3$, $(Ba_{1-x}Ca_x)(Ti_{1-y}Ca_y)O_3$ (here, $0 \leq x \leq 0.3$ and $0 \leq y \leq 0.1$), $(Ba_{1-x}Ca_x)(Ti_{1-y}Zr_y)O_3$ (here, $0 \leq x \leq 0.3$ and $0 \leq y \leq 0.5$), and $Ba(Ti_{1-y}Zr_y)O_3$ (here, $0 < y \leq 0.5$) as a main component, but are not limited thereto. For example, as a main component, the amount of $BaTiO_3$ may be at least 50% by weight of a total weight of $BaTiO_3$ and accessory component(s) in a paste used to form the margin portion.

According to an exemplary embodiment in the present disclosure, the margin portions 114 and 115 may include the oxide including Zn as the first accessory component in addition to the main component described above, and may include Zn in an amount of 0.5 mol % or more and less than 1.5 mol % based on 100 mol % of Ti included in the margin portions 114 and 115.

The oxide including Zn may serve to the suppress grain growth of the dielectric grains included in the margin portion through the drag effect as described above. In addition, the oxide including Zn has been known as a representative low-temperature sintering aid due to a low melting point.

Meanwhile, when the content of Zn included in the margin portion is less than 0.5 mol % based on 100 mol % of Ti included in the margin portion, an influence of Zn on low-temperature sintering may be insignificant, and a grain growth decrease effect may be insignificant, such that a dissipation factor (DF) decrease effect and an effective capacitance change rate decrease effect under a DC electric field may be insufficient.

When the content of Zn included in the margin portion exceeds 1.5 mol % based on 100 mol % of Ti included in the margin portion, there may be a grain growth decrease effect and an effect of enabling low-temperature sintering, but the oxide including Zn may be excessively segregated at grain boundaries of the margin portions 114 and 115 to excessively hinder the grain growth of the dielectric grains of the margin portions, and resultantly decrease compactness of the dielectric grains, such that moisture resistance reliability and harsh reliability may be deteriorated.

Therefore, in an exemplary embodiment in the present disclosure, the margin portions 114 and 115 may include Zn in an amount of 0.5 mol % or more and less than 1.5 mol % based on 100 mol % of Ti included in the margin portions 114 and 115, such that the multilayer electronic component may have a dissipation factor (DF) decrease effect and an effective capacitance change rate decrease effect under a DC electric field, and the compactness of the dielectric grains of the margin portions 114 and 115 may be improved to improve moisture resistance reliability and harsh reliability of the multilayer electronic component.

Meanwhile, the oxide including Zn may be zinc oxide (ZnO), but is not limited thereto, and may be an oxide including zinc having various oxidation numbers.

In addition, the content of Zn or the oxide including Zn included in the margin portions 114 and 115 may be determined by stacking the first and second internal electrodes 121 and 122, cutting a laminate so that the internal electrodes are exposed to the fifth and sixth surfaces 5 and 6 of the body, and then stacking dielectric sheets on opposite side surfaces of the capacitor forming part Ac in the third direction (width direction), and adjusting a content of ZnO added to the dielectric sheets.

In an exemplary embodiment, the margin portion includes a plurality of dielectric grains, and an average grain size of the dielectric grains included in the margin portion may exceed 90 nm and be 140 nm or less.

Figure 5:
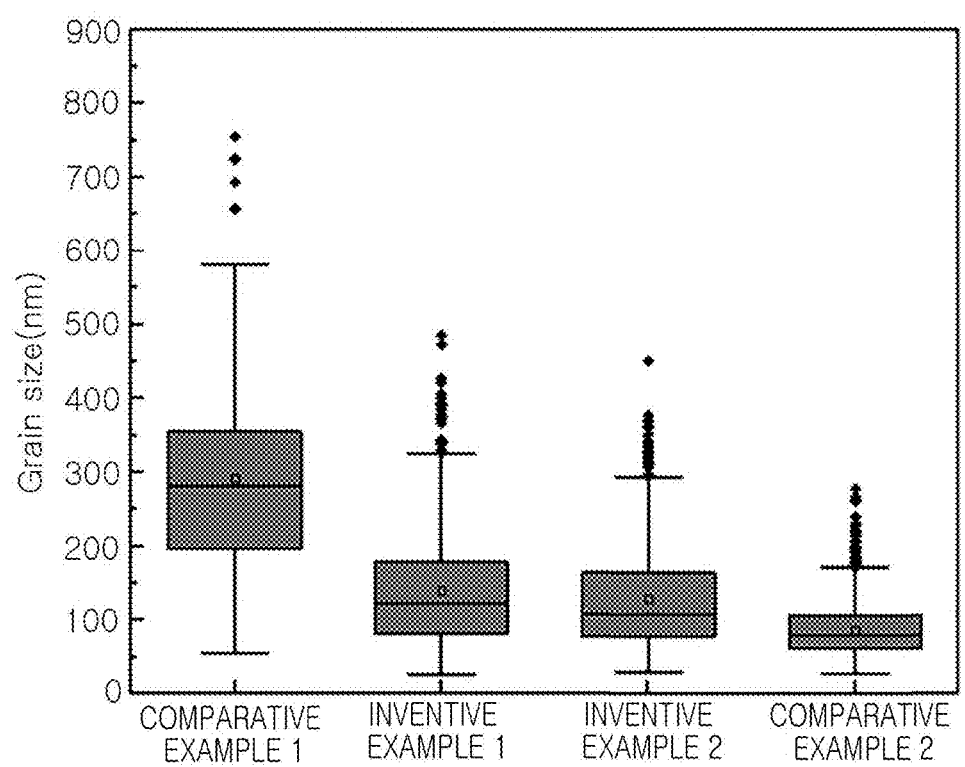
FIG. 5 is a graph illustrating grain sizes of margin portions according to Examples and Comparative Examples.

As described above, according to an exemplary embodiment in the present disclosure, the margin portions 114 and 115 may include Zn in an amount of 0.5 mol % or more and less than 1.5 mol % based on 100 mol % of Ti included in the margin portions 114 and 115. Referring to FIG. 5 to be described later, the average grain size of the dielectric grains of the margin portion may vary depending on the content of Zn. Specifically, the average grain size of the dielectric grains of the margin portion may be 300 nm when the margin portion does not include the oxide including Zn (Comparative Example 1), may be 140 nm when the margin portion includes Zn in an amount of 0.5 mol % based on 100 mol % of Ti included in the margin portion (Example 1), may be 130 nm when the margin portion includes Zn in an amount of 1.0 mol % based on 100 mol % of Ti included in the margin portion (Example 2), and may be 90 nm when the margin portion includes Zn in an amount of 1.5 mol % based on 100 mol % of Ti included in the margin portion (Comparative Example 2). Accordingly, in an exemplary embodiment in the present disclosure, the margin portion may include the plurality of dielectric grains, and the average grain size of the dielectric grains included in the margin portion may exceed 90 nm and be 140 nm or less, such that the multilayer electronic component may have an excellent dissipation factor (DF) decrease effect and effective capacitance change rate decrease effect under the DC electric field, and a moisture resistance reliability and harsh reliability improvement effect.

In an exemplary embodiment, the margin portion may include the plurality of dielectric grains and grain boundaries disposed between the dielectric grains, and the oxide including Zn may be segregated and disposed at the grain boundaries of the margin portion. Accordingly, the growth of grains included in the margin portion may be suppressed by inducing a drag effect that hinders the movement of the grain boundaries at the time of grain growth of a dielectric in the margin portion.

In an exemplary embodiment, the margin portion and the dielectric layer may each include a plurality of dielectric grains, and $1/4 < Dm/Da < 1/2$ in which Dm is an average grain size of the dielectric grains included in the margin portion and Da is an average grain size of the dielectric grains included in the dielectric layer.

When Dm/Da is $1/4$ or less, the average grain size (Dm) of the dielectric grains included in the margin portion may be small, while the average grain size (Da) of the dielectric grains included in the dielectric layer may be large, and thus, the multilayer electronic component may have an excellent dissipation factor (DF) decrease effect and effective capacitance change rate decrease effect under the DC electric field, but the average grain size (Dm) of the dielectric grains included in the margin portion may be excessively small, which may be disadvantageous in terms of high temperature and severe reliability.

When Dm/Da is $1/2$ or more, the average grain size (Dm) of the dielectric grains included in the margin portion may be large, while the average grain size (Da) of the dielectric grains included in the dielectric layer 111 may be small, and thus, the multilayer electronic component may not have a dissipation factor (DF) decrease effect and an effective capacitance change rate decrease effect under the DC electric field, and a permittivity of the dielectric layer 111 included in the capacitance formation portion may be decreased, such that capacitance of the multilayer electronic component 100 per unit volume of the multilayer electronic component 100 may be decreased.

Accordingly, in an exemplary embodiment, $1/4 < Dm/Da < 1/2$, such that the multilayer electronic component may have a dissipation factor (DF) decrease effect and an effective capacitance change rate decrease effect under the DC electric field, a moisture resistance reliability and harshness reliability improvement effect, and a capacitance increase effect per unit volume.

The "average grain size (Da)" of the dielectric grains included in the dielectric layer 111 may refer to an average value obtained by capturing images of ten places of the capacitance formation portion AC positioned at equal intervals in the length direction in a cross section of the multilayer electronic component in the length-thickness directions passing through the center of the multilayer electronic component, with a scanning electron microscope (SEM), and then calculating grain sizes using an image analysis program (LAS X Grain Expert available from Leica Microsystems GmbH).

In addition, the "average grain size (Dm)" of the dielectric grains included in the margin portions 114 and 115 may refer to an average value obtained by magnifying a region of first direction x third direction=20 µm×10 µm at a central portion of each of margin portion regions disposed on opposite side surfaces of the capacitance formation portion Ac in the third direction at 50,000 magnifications and capturing an image of the magnified region in the cross section of the multilayer electronic component in the length-thickness directions passing through the center of the multilayer electronic component, with a scanning electron microscope (SEM), and then calculating grain sizes using an image analysis program (Zootos available from the Zootos, Co., Ltd).

According to an exemplary embodiment, the dielectric layer 111 may not include an oxide including Zn. Accordingly, the grain growth of the dielectric grains included in the margin portion may be suppressed, such that the multilayer electronic component may have a reliability improvement effect, a dissipation factor (DF) decrease effect, and an effective capacitance change rate decrease effect under the DC electric field, and the grain growth of the dielectric grains included in the dielectric layer 111 may not be suppressed, such that a permittivity of the multilayer electronic component 100 may be improved to improve capacitance of the multilayer electronic component 100 per unit volume.

According to an exemplary embodiment, the dielectric layer may include an oxide including Zn, and a content of the oxide including Zn, included in the margin portion and a content of the oxide including Zn, included in the dielectric layer may be different from each other. Accordingly, by appropriately adjusting the grain growth of the dielectric grains included in the dielectric layer 111 and adjusting the grain growth of the dielectric grains included in the margins 114 and 115, the dissipation factor (DF) decrease effect and the effective capacitance change rate decrease effect under the DC electric field, the moisture resistance reliability and harshness reliability improvement effect, and the capacitance increase effect per unit volume of the multilayer electronic component may become more remarkable.

In this regard, more preferably, the content of the oxide including Zn, included in the margin portion may be greater than the content of the oxide including Zn, included in the dielectric layer. Accordingly, the grain growth of the dielectric grains of the dielectric layer 111 contributing to forming the capacitance may be less suppressed to contribute to forming the capacitance, and the grain growth of the dielectric grains of the margin portions 114 and 115 that do not contribute to forming the capacitance may be suppressed, such that the multilayer electronic component may have the dissipation factor (DF) decrease effect and the effective capacitance change rate decrease effect under the DC electric field, and the moisture resistance reliability and harshness reliability improvement effect.

A method of varying a component of the margin portions 114 and 115, a content of an element included in the dielectric layer 111, and an average grain size of the dielectric grains is as follows.

According to an exemplary embodiment, the margin portion may include an oxide or a carbonate including a fixed-valence acceptor element Mg as a second accessory component, and may include Mg in an amount of 0.1 mol % or more and 1.5 mol % or less based on 100 mol % of Ti included in the margin portion.

The fixed-valence acceptor element and compounds including the fixed-valence acceptor element may act as an acceptor to serve to decrease an electron concentration. The margin portion may include the fixed-valence acceptor element Mg, which is the second accessory component, in an amount of 0.1 mol % or more and 1.5 mol % or less based on 100 mol % of Ti included in the margin portion to significantly increase a reliability improve effect due to a change to an n-type.

When a content of the second accessory component exceeds 1.5 mol % based on 100 mol % of Ti included in the margin portion, there may be a problem in which a permittivity is decreased, and there may be a problem in which a breakdown voltage (BDV) is decreased, which is not preferable.

According to an exemplary embodiment, the margin portion may include an oxide or a carbonate including Dy as a third accessory component, and may include Dy in an amount of 0.5 mol % or more and 2.0 mol % or less based on 100 mol % of Ti included in the margin portion.

The third accessory component may serve to improve reliability of the multilayer electronic component. When a content of the third accessory component exceeds 2.0 mol % based on 100 mol % of Ti included in the margin portion, a problem in which a permittivity is decreased and high-temperature withstand voltage characteristics are deteriorated may occur.

According to an exemplary embodiment, the margin portion may include an oxide or a carbonate including Tb as a fourth accessory component, and may include Tb in an amount of 0.2 mol % or more and 0.5 mol % or less based on 100 mol % of Ti included in the margin portion.

The fourth accessory component may serve to improve reliability of the multilayer electronic component. When a content of the fourth accessory component exceeds 0.5 mol % based on 100 mol % of Ti included in the margin portion, a problem in which a permittivity is decreased and high-temperature withstand voltage characteristics are deteriorated may occur.

According to an exemplary embodiment, the margin portion may include an oxide including at least one of Si and Al or a glass compound including Si as a fifth accessory component, and may include Si or Al in an amount of 3.0 mol % or more and 5.6 mol % or less based on 100 mol % of Ti included in the margin portion.

A content of the fifth accessory component may be based on a content of at least one of Si and Al included in the fifth accessory component without distinguishing an addition form such as a glass, an oxide, or a carbonate.

The fifth accessory component may serve to decrease a sintering temperature of a multilayer ceramic capacitor to which a dielectric magnetic composition is applied and improve high-temperature withstand voltage characteristics of the multilayer ceramic capacitor.

When the content of the fifth accessory component exceeds 5.6 mol % based on 100 mol % of Ti included in the margin portion, a problem such as a decrease in sinterability and compactness and secondary phase formation may occur, which is not preferable.

In particular, according to an exemplary embodiment in the present disclosure, since the margin portion includes Al in an amount of 0.6 mol % or less, Al may act as an acceptor to decrease an electron concentration, which is effective in improving reliability.

Examples of a method of measuring a content of each element in the dielectric layer 111 and the margin portions 114 and 115 will be described. In a case of a non-destructive method, components inside grains of the dielectric layer 111 and the margins 114 and 115 may be analyzed at a central portion of a chip using transmission electron microscope-energy dispersive X-ray spectroscopy (TEM-EDS). A flaked analysis sample may be prepared using a focused ion beam (FIB) device in a region including the dielectric layer 111 and the margins 114 and 115 on one end surface of a body of which sintering has been completed. In addition, a damaged layer on a surface of the flaked analysis sample may be removed using Ar ion milling, and mapping and quantitative analysis of each component may be performed in an image obtained using scanning transmission electron microscopy-energy dispersive X-ray spectroscopy (STEM-EDX). In this case, a quantitative analysis graph of each component may be obtained as a mass fraction of each element, which may be converted into and be expressed as a molar fraction. In addition, in a case of a destructive method, the multilayer electronic component may be crushed, the internal electrodes may be removed, dielectrics of the margin portion and the dielectric layer may be selected, and components of the dielectrics selected as described above may be analyzed using a method such as an inductively coupled plasma optical emission spectroscopy (ICP-OES) or an inductively coupled plasma mass spectrometry (ICP-MS).

A plurality of internal electrodes 121 and 122 may be alternately disposed with each of the dielectric layers 111 interposed therebetween.

The plurality of internal electrodes 121 and 122 may include the first and second internal electrodes 121 and 122. The first and second internal electrodes 121 and 122 may be alternately disposed to face each other with each of the dielectric layers 111 constituting the body 110 interposed therebetween, and may be connected to the third and fourth surfaces 3 and 4 of the body 110, respectively.

Specifically, one ends of the first internal electrodes 121 may be connected to the third surface, and one ends of the second internal electrodes 122 may be connected to the fourth surface.

The first internal electrodes 121 may be spaced apart from the fourth surface 4 and be exposed through the third surface 3, and the second internal electrodes 122 may be spaced apart from the third surface 3 and be exposed through the fourth surface 4. A first external electrode 131 may be disposed on the third surface 3 of the body and be connected to the first internal electrodes 121, and a second external electrode 132 may be disposed on the fourth surface 4 of the body and be connected to the second internal electrodes 122.

That is, the first internal electrodes 121 are not connected to the second external electrode 132, and may be connected to the first external electrode 131, and the second internal electrodes 122 are not connected to the first external electrode 131, and may be connected to the second external electrode 132. Therefore, the first internal electrodes 121 may be spaced apart from the fourth surface 4 by a predetermined distance, and the second internal electrodes 122 may be spaced apart from the third surface 3 by a predetermined distance.

In this case, the first and second internal electrodes 121 and 122 may be electrically separated from each other by each of the dielectric layers 111 disposed therebetween.

The body 110 may be formed by alternately stacking ceramic green sheets on which the first internal electrode 121 is printed and ceramic green sheets on which the second internal electrode 122 is printed and then sintering the stacked ceramic green sheets.

A material of each of the internal electrodes 121 and 122 is not particularly limited, and may be a material having excellent electrical conductivity. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for an internal electrode including one or more of nickel (Ni), copper (Cu), palladium (Pd), silver (Ag), gold (Au), platinum (Pt), tin (Sn), tungsten (W), titanium (Ti), and alloys thereof on ceramic green sheets. A method of printing the conductive paste for an internal electrode may be a screen printing method, a gravure printing method or the like, but is not limited thereto.

In an exemplary embodiment, the internal electrodes 121 and 122 may include Ni. In this case, Ni may form an alloy with copper (Cu) included in first electrode layers 131a and 132a according to the present disclosure to be described later, or may improve electrical connectivity through metal bonding.

Meanwhile, an average thickness the of each of the internal electrodes 121 and 122 does not need to be particularly limited. For example, the average thickness the of the each of the internal electrodes 121 and 122 may be 0.2 μm or more and 2 μm or less.

However, in general, when the internal electrode is formed to have a small thickness less than 0.6 μm, in particular, when a thickness of the internal electrode is 0.35 μm or less, reliability of the multilayer electronic component 100 may be further problematic.

According to an exemplary embodiment in the present disclosure, since the margin portion includes the oxide including Zn as the first accessory component and includes Zn in an amount of 0.5 mol % or more and less than 1.5 mol % based on 100 mol % of Ti included in the margin portion, even when the average thickness the of each of the internal electrodes 121 and 122 is 0.35 μm or less, reliability of the multilayer electronic component may be improved.

Accordingly, when the average thickness of each of the internal electrodes 121 and 122 is 0.35 μm or less, an effect of the multilayer electronic component according to the present disclosure may become more remarkable, and miniaturization and a high capacitance of the multilayer electronic component may be more easily achieved.

The average thickness the of each of the internal electrodes 121 and 122 may refer to an average thickness the of each of the first and second internal electrodes 121 and 122.

The average thickness the of each of the internal electrodes 121 and 122 may be measured from an image obtained by scanning a cross section of the body 110 in the length and thickness directions (L-T) with a scanning electron microscope (SEM) of 10,000 magnifications. More specifically, an average value may be measured by measuring thicknesses of one internal electrode at 30 points positioned at equal intervals in the length direction in the obtained image. The 30 points positioned at equal intervals may be designated in the capacitance formation portion Ac. In addition, when an average thickness of ten internal electrodes is measured, the average thickness of the internal electrode layer may be further generalized.

The external electrodes 131 and 132 may be disposed on the third surface 3 and the fourth surface 4 of the body 110, respectively. The external electrodes 131 and 132 may include first and second external electrodes 131 and 132 disposed on the third and fourth surfaces 3 and 4 of the body 110, respectively, and connected to the first and second internal electrodes 121 and 122, respectively.

A structure in which the multilayer electronic component 100 includes two external electrodes 131 and 132 has been described in the present exemplary embodiment, but the number, shapes or the like, of external electrodes 131 and 132 may be changed depending on shapes of the internal electrodes 121 and 122 or other purposes.

Meanwhile, the external electrodes 131 and 132 may be formed of any material having electrical conductivity, such as a metal, a specific material of each of the external electrodes 131 and 132 may be determined in consideration of electrical characteristics, structural stability and the like, and the external electrodes 131 and 132 may have a multilayer structure.

For example, the external electrodes 131 and 132 may include electrode layers disposed on the body 110 and plating layers formed on the electrode layers, respectively.

As a more specific example of the electrode layer, the electrode layer may be a fired electrode including a conductive metal and glass or a resin-based electrode including a conductive metal or a resin.

Alternatively, the electrode layer may have a form in which a fired electrode and a resin electrode are sequentially formed on the body. In addition, the electrode layer may be formed in a manner of transferring a sheet including a conductive metal onto the body or be formed in a manner of transferring a sheet including a conductive metal onto a fired electrode.

The conductive metal included in the electrode layer may be a material having excellent electrical connectivity, but is not particularly limited thereto. For example, the conductive metal may be one or more of nickel (Ni), copper (Cu), and alloys thereof.

The plating layer serves to improve mounting characteristics. A type of the plating layer is not particularly limited, and the plating layer may be a plating layer including one or more of Ni, Sn, Pd, and alloys thereof, and may be formed as a plurality of layers.

As a more specific example of the plating layer, the plating layer may be a Ni plating layers or a Sn plating layer, may have a form in which a Ni plating layer and a Sn plating layer are sequentially formed on the electrode layer, or may have a form in which a Sn plating layer, a Ni plating layer, and a Sn plating layer are sequentially formed. Alternatively, the plating layer may include a plurality of Ni plating layers and/or a plurality of Sn plating layers.

A size of the multilayer electronic component 100 need not be particularly limited.

However, since the numbers of stacked dielectric layers and internal electrodes need to be increased by decreasing thicknesses of the dielectric layers and the internal electrodes in order to achieve both of the miniaturization and the high capacitance of the multilayer electronic component, a sticking strength improvement effect according to the present disclosure in a multilayer electronic component 100 having a size of 0603 (length×width: 0.6 mm×0.3 mm) or less may become more remarkable.

Accordingly, considering a manufacturing error, sizes of external electrodes, and the like, when a length of the multilayer electronic component 100 is 0.66 mm or less and a width of the multilayer electronic component 100 is 0.33 mm or less, the sticking strength improvement effect according to the present disclosure may become more remarkable. Here, the length of the multilayer electronic component 100 may refer to a maximum size of the multilayer electronic component 100 in the second direction, and the width of the multilayer electronic component 100 may refer to a maximum size of the multilayer electronic component 100 in the third direction.

Example

A multilayer electronic component according to Example was manufactured so that a margin portion includes Zn in an amount of 0.5 mol % or more and less than 1.5 mol % based on 100 mol % of Ti included in the margin portion. Specifically, the margin portions 114 and 115 were formed by stacking the dielectric layers 111 and the internal electrodes 121 and 122, cutting a laminate so that the internal electrodes are exposed to the fifth and sixth surfaces 5 and 6 of the body, and then stacking a single dielectric layer or two or more dielectric layers on opposite side surfaces of the capacitance formation portion Ac in the third direction (width direction). In this case, the dielectric layer included in the margin portion was formed using a dielectric sheet including ZnO, additives, organic solvents, binders, dispersants, and the like, in addition to powders such as barium titanate ($BaTiO_3$) powders, and was formed by adjusting a content of ZnO included in the dielectric sheet.

After the margin portion was formed, heat was applied to the margin portion to remove the binders, and sintering was then performed to form the body 110.

Next, a termination process and an electrode firing process were performed on the sintered body using a copper (Cu) paste to complete external electrodes.

A multilayer electronic component according to Example 1 of the Examples was manufactured so that a content of Zn was 0.5 mol % based on 100 mol % of Ti in the margin portion.

Next, a multilayer electronic component according to Example 2 was manufactured so that a content of Zn was 1.0 mol % based on 100 mol % of Ti in the margin portion.

Comparative Example 1 is a conventional case where the margin portion does not include the oxide including Zn, and the other configurations of Comparative Example 1 are the same as those of the above-described Example.

Comparative Example 2 is a case where a content of Zn included in the margin portion is 1.5 mol % based on 100 mol % of Ti included in the margin portion, and the other configurations of Comparative Example 2 are the same as those of the above-described Example.

Table 1 represents dissipation factors (DF) and effective capacitance change rates at DC 1 V of prototype multilayer electronic components according to Experimental Examples (Examples 1 and 2 and Comparative Examples 1 and 2).

TABLE 1

| Experimental Example | Content of Zn (mol %) Based on 100 mol % of Ti | DF (%) | Effective Capacitance Change Rate (%) at DC 1 V |
|---|---|---|---|
| Comparative Example 1 | 0 | 7.42 | −15.3 |
| Example 1 | 0.5 | 6.81 | −13.3 |
| Example 2 | 1.0 | 6.45 | −12.8 |
| Comparative Example 2 | 1.5 | 6.66 | −12.9 |

Referring to Table 1, it can be seen that in Comparative Example 1, which is a case where the margin portion does not include the oxide including Zn, there is a problem in a dissipation factor (DF), and there is a problem in which an effective capacitance change rate at DC 1 V is a high.

It can be seen that in Examples 1 and 2, which are cases where the margin portion includes Zn in an amount of 0.5 mol % or more and less than 1.5 mol % based on 100 mol % of Ti included in the margin portion, there are a dissipation factor (DF) decrease effect and an effective capacitance change rate decrease effect under a DC electric field.

However, in Comparative Example 2 in which the margin portion includes Zn in an amount of 1.5 mol % based on 100 mol % of Ti included in the margin portion, there are a dissipation factor (DF) decrease effect and an effective capacitance change rate decrease effect under a DC electric field, but there is a problem in which a reliability decrease phenomenon prominently appears as described later.

FIG. 5 is a graph illustrating grain sizes of margin portions according to Examples and Comparative Examples.

Referring to FIG. 5, it can be seen that the average grain size of the dielectric grains of the margin portion is 300 nm when the margin portion does not include the oxide including Zn (Comparative Example 1), is 140 nm when the margin portion includes Zn in an amount of 0.5 mol % based on 100 mol % of Ti included in the margin portion (Example 1), is 130 nm when the margin portion includes Zn in an amount of 1.0 mol % based on 100 mol % of Ti included in the margin portion (Example 2), and is 90 nm when the margin portion includes Zn in an amount of 1.5 mol % based on 100 mol % of Ti included in the margin portion (Comparative Example 2).

That is, it can be seen that in Comparative Example 1 in which the content of Zn in the margin portion is less than 0.5 mol % based on 100 mol % of Ti included in the margin portion, a grain growth suppression effect is insignificant. It can be seen that in Examples 1 and 2 in which the content of Zn in the margin portion is 0.5 mol % or more based on 100 mol % of Ti included in the margin portion, compactness of the dielectric grains of the margin portion appears at the same sintering temperature, and a clear grain growth suppression effect appears. On the other hand, it can be seen that in Comparative Example 2 which the content of Zn in the margin portion exceeds 1.5 mol % based on 100 mol % of Ti included in the margin portion, the grain growth of the dielectric grains of the margin portion is excessively suppressed.

Such a grain growth suppression effect and compactness effect of the margin portion may significantly decrease a DF decrease and a DC effective capacitance change rate.

Figure 6A:
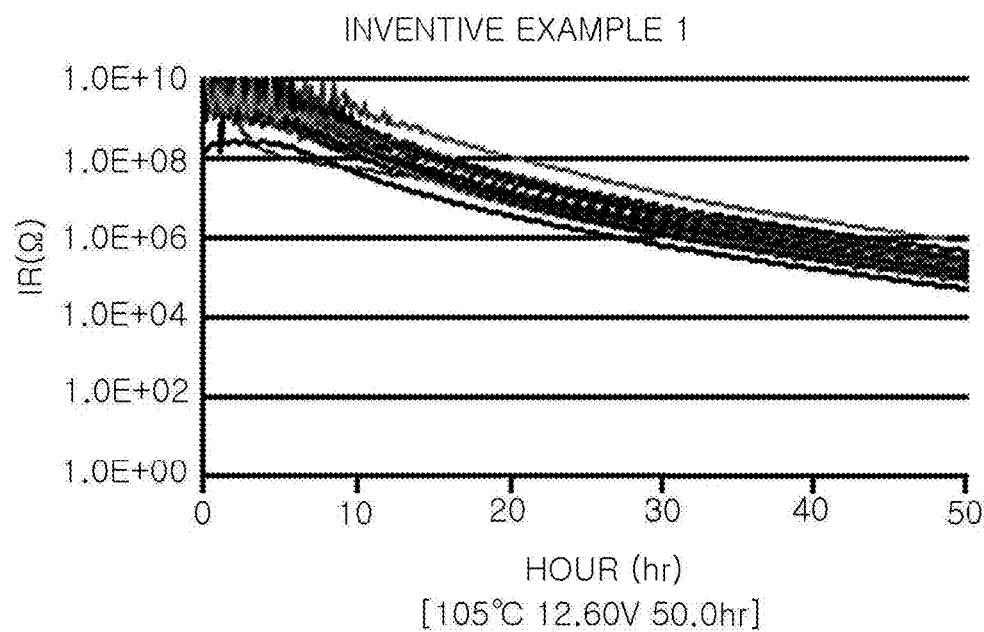
FIGS. 6A and 6B are, respectively, graphs of evaluation results of severe reliability and moisture resistance reliability according to Example.
Figure 6B:
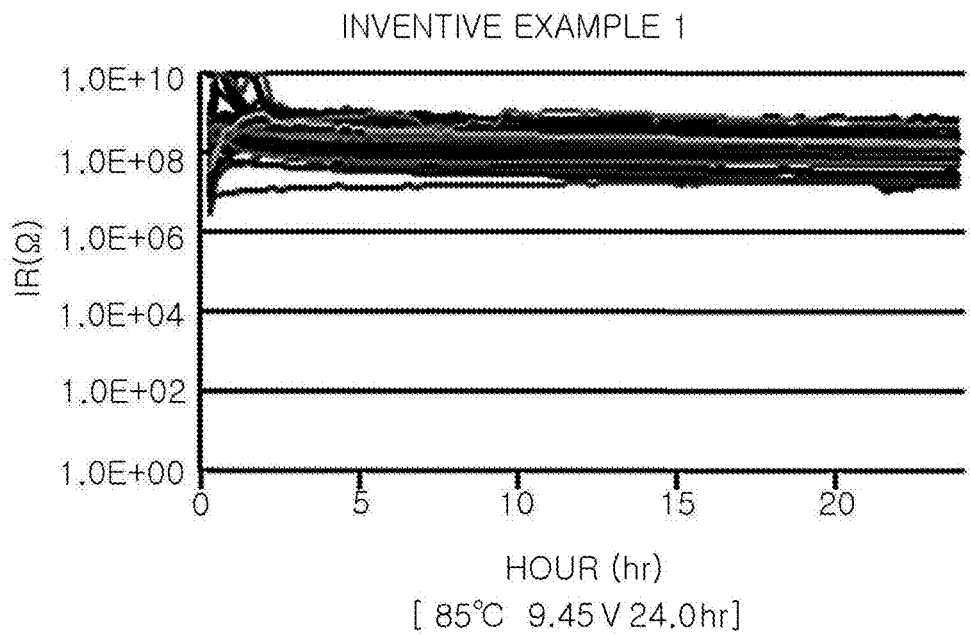

FIGS. 6A and 6B are, respectively, graphs of evaluation results of severe reliability and moisture resistance reliability according to Example.

Referring to FIGS. 6A and 6B, it can be seen that when the content of Zn in the margin portion is 0.5 mol % based on 100 mol % of Ti included in the margin portion (Example 1), the grain growth of the dielectric grains of the margin portion is suppressed, and compactness of the dielectric grains is excellent, such that harsh reliability and moisture resistance reliability are excellent.

Figure 7A:
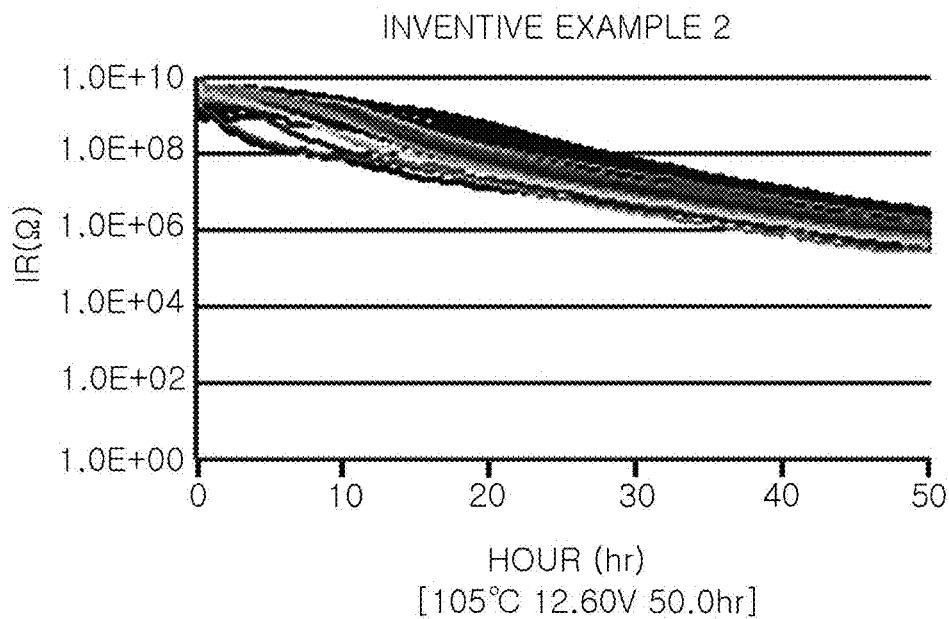
FIGS. 7A and 7B are, respectively, graphs of evaluation results of severe reliability and moisture resistance reliability according to Example.
Figure 7B:
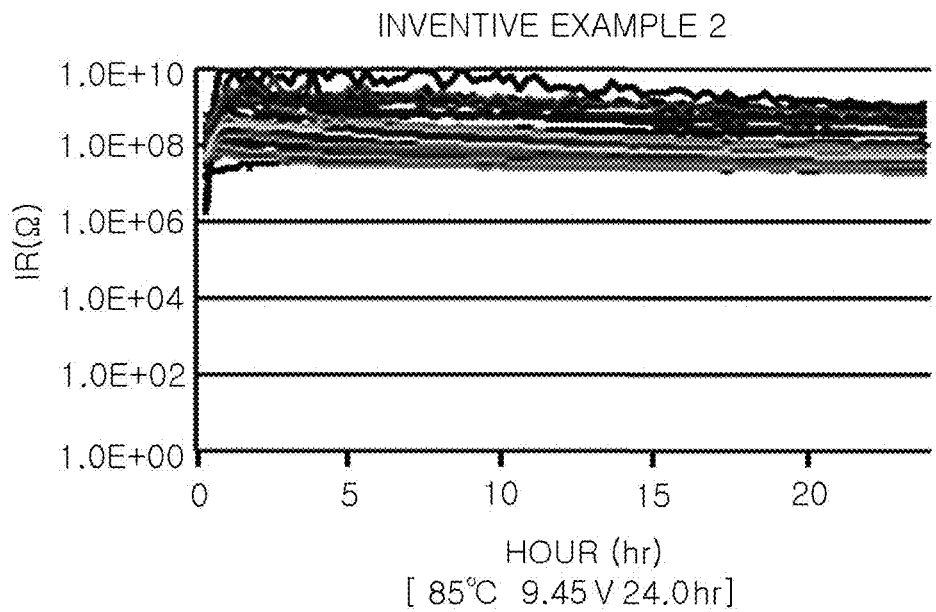

FIGS. 7A and 7B are, respectively, graphs of evaluation results of severe reliability and moisture resistance reliability according to Example.

Referring to FIGS. 7A and 7B, it can be seen that when the content of Zn in the margin portion is 1.0 mol % based on 100 mol % of Ti included in the margin portion (Example 2), the grain growth of the dielectric grains of the margin portion is suppressed, and compactness of the dielectric grains is excellent, such that harsh reliability and moisture resistance reliability are excellent.

Figure 8A:
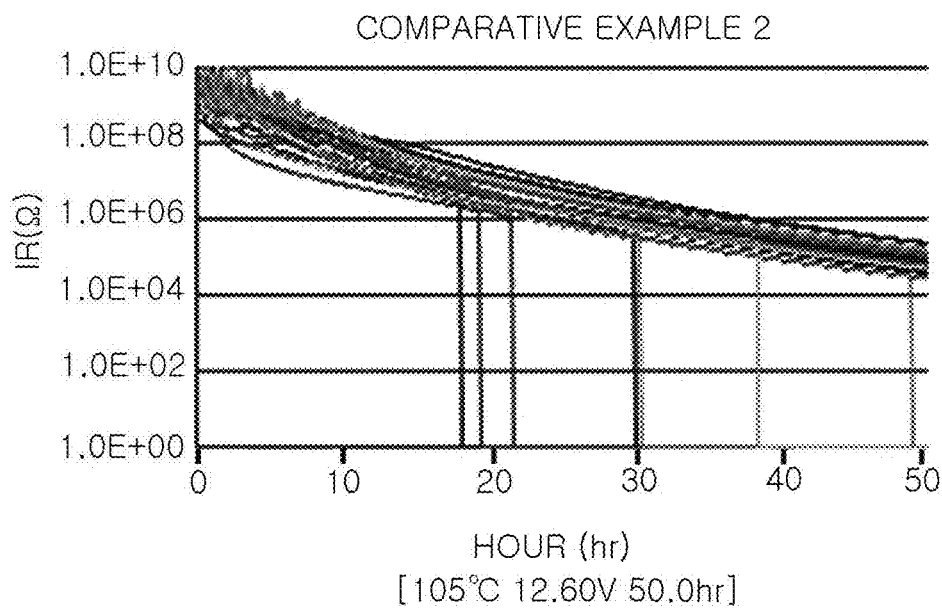
FIGS. 8A and 8B are, respectively, graphs of evaluation results of severe reliability and moisture resistance reliability according to Comparative Example.
Figure 8B:
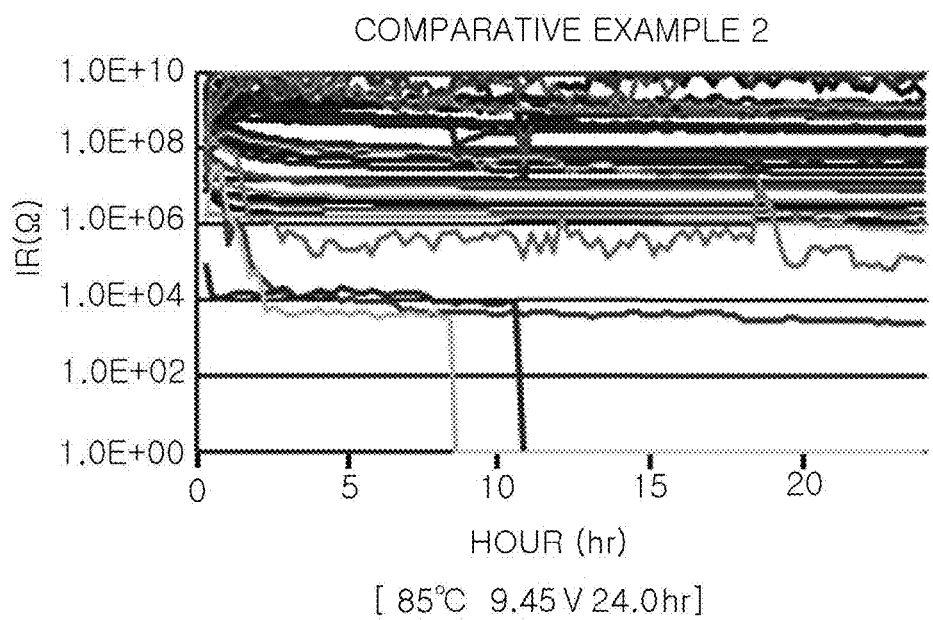

FIGS. 8A and 8B are, respectively, graphs of evaluation results of severe reliability and moisture resistance reliability according to Comparative Example.

Referring to FIG. 8, it can be seen that when the content of Zn in the margin portion is 1.5 mol % based on 100 mol % of Ti included in the margin portion (Comparative Example 2), severe reliability and moisture resistance reliability are significantly decreased. This is because the oxide including Zn is excessively segregated at the grain boundaries of the margin portion, and excessively hinders the grain growth to decrease compactness of the dielectric grains.

Accordingly, according to an exemplary embodiment in the present disclosure, the margin portion may include Zn in an amount of 0.5 mol % or more and less than 1.5 mol % based on 100 mol % of Ti included in the margin portion to appropriately suppress the grain growth of the dielectric grains of the margin portion and improve the compactness of the dielectric grains, such that the multilayer electronic component may have a DF decrease effect, a DC capacitance change rate decrease effect, and moisture resistance and high-temperature reliability improvement effect.

As set forth above, according to an exemplary embodiment in the present disclosure, even though the grain growth of the dielectric layer included in the capacitance formation portion is not excessively suppressed, the compactness of the dielectric grains at a low temperature may be enabled, the dissipation factor (DF) may be decreased, the effective capacitance change rate under the DC electric field may be decreased, by suppressing the grain growth of the dielectric layer included in the margin portion.

In addition, the high-temperature reliability and the moisture resistance reliability may be improved by improving the compactness while suppressing the grain growth of the margin portion.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including dielectric layers and a plurality of first and second internal electrodes alternately disposed with respective dielectric layers interposed therebetween and having first and second surfaces opposing each other in a first direction, third and fourth surfaces connected to the first and second surfaces and opposing each other in a second direction, and fifth and sixth surfaces connected to the first to fourth surfaces and opposing each other in a third direction, wherein the body is sintered; and
external electrodes disposed on the body,
wherein the body includes a capacitance formation portion forming capacitance by including the first and second internal electrodes alternately disposed with respective dielectric layers interposed therebetween and margin portions disposed on opposite side surfaces of the capacitance formation portion in the third direction, respectively,
at least one of the dielectric layers and at least one of the margin portions include a $BaTiO_3$-based main component, and
the at least one of the margin portions includes an oxide including Zn as a first accessory component and includes Zn in an amount of 0.5 mol % or more and less than 1.5 mol % based on 100 mol % of Ti included in the at least one of the margin portions.

2. The multilayer electronic component of claim 1, wherein the oxide including Zn is ZnO.

3. The multilayer electronic component of claim 1, wherein the at least one of the margin portions includes a plurality of dielectric grains, and
an average grain size of the dielectric grains included in the at least one of the margin portions exceeds 90 nm and is 140 nm or less.

4. The multilayer electronic component of claim 1, wherein the at least one of the margin portions includes a plurality of dielectric grains and grain boundaries disposed between the dielectric grains, and
the oxide including Zn is segregated and disposed at the grain boundaries.

5. The multilayer electronic component of claim 1, wherein the at least one of the margin portions and the at least one of the dielectric layers each includes a plurality of dielectric grains, and
$1/4 < Dm/Da < 1/2$ in which Dm is an average grain size of the dielectric grains included in the at least one of the margin portions and Da is an average grain size of the dielectric grains included in the at least one of the dielectric layers.

6. The multilayer electronic component of claim 1, wherein the at least one of the margin portions includes an oxide or a carbonate including a fixed-valence acceptor element Mg as a second accessory component, and includes Mg in an amount of 0.1 mol % or more and 1.5 mol % or less based on 100 mol % of Ti included in the at least one of the margin portions.

7. The multilayer electronic component of claim 1, wherein the at least one of the margin portions includes an oxide or a carbonate including Dy as a third accessory component, and includes Dy in an amount of 0.5 mol % or more and 2.0 mol % or less based on 100 mol % of Ti included in the at least one of the margin portions.

8. The multilayer electronic component of claim 1, wherein the at least one of the margin portions includes an oxide or a carbonate including Tb as a fourth accessory component, and includes Tb in an amount of 0.2 mol % or more and 0.5 mol % or less based on 100 mol % of Ti included in the at least one of the margin portions.

9. The multilayer electronic component of claim 1, wherein the at least one of the margin portions includes an oxide including at least one of Si and Al or a glass compound including Si as a fifth accessory component, and includes Si or Al in an amount of 3.0 mol % or more and 5.6 mol % or less based on 100 mol % of Ti included in the at least one of the margin portions.

10. The multilayer electronic component of claim 1, wherein the at least one of the dielectric layers does not include an oxide including Zn.

11. The multilayer electronic component of claim 1, wherein the at least one of the dielectric layers includes an oxide including Zn,
a content of the oxide including Zn, included in the at least one of the margin portions and a content of the oxide including Zn, included in the at least one of the dielectric layers are different from each other.

12. The multilayer electronic component of claim 11, wherein the content of the oxide including Zn, included in the margin portion is greater than the content of the oxide including Zn, included in the dielectric layer.

13. A method for manufacturing the multilayer electronic component of claim 1, comprising:
cutting at least one surface of a laminate along a first direction, the laminate including the dielectric layers and the plurality of first and second internal electrodes; and
applying at least one dielectric sheet to the at least one cut surface on the laminate to form a margin portion, wherein the at least one dielectric sheet includes the oxide including Zn.

14. The method of claim 13, wherein the oxide including Zn is ZnO.

15. The method of claim 13, wherein the at least one dielectric sheet further includes at least one binder.

16. The method of claim 15, further comprising heating the applied at least one dielectric sheet to remove the at least one binder.

17. The method of claim 13, further comprising sintering the laminate and the applied at least one dielectric sheet to form the body of the multilayer electronic component.

18. The multilayer electronic component of claim 1, wherein a content of the oxide including Zn included in the at least one of the margin portions and a content of the oxide including Zn of the at least one of the dielectric layers are different from each other.

19. A multilayer electronic component comprising:
a body including dielectric layers and a plurality of first and second internal electrodes alternately disposed with respective dielectric layers interposed therebetween and having first and second surfaces opposing each other in a first direction, third and fourth surfaces connected to the first and second surfaces and opposing each other in a second direction, and fifth and sixth surfaces connected to the first to fourth surfaces and opposing each other in a third direction; and
external electrodes disposed on the body,
wherein the body includes a capacitance formation portion forming capacitance by including the first and second internal electrodes alternately disposed with respective dielectric layers interposed therebetween and margin portions disposed on opposite side surfaces of the capacitance formation portion in the third direction, respectively,
at least one of the dielectric layers and at least one of the margin portions include a $BaTiO_3$-based main component,
the at least one of the margin portions includes an oxide including Zn as a first accessory component and includes Zn in an amount of 0.5 mol % or more and less than 1.5 mol % based on 100 mol % of Ti included in the at least one of the margin portions, and
a content of the oxide including Zn included in the at least one of the margin portions and a content of the oxide including Zn of the at least one of the dielectric layers are different from each other.

* * * * *